(12) United States Patent
Becker et al.

(10) Patent No.: US 7,631,837 B2
(45) Date of Patent: Dec. 15, 2009

(54) ELECTRICAL INTERLOCK AND INDICATION SYSTEM FOR AIRCRAFT

(75) Inventors: Randall P. Becker, Lake Stevens, WA (US); Leo W. Plude, Woodinville, WA (US); Malcolm S. Bryant, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 429 days.

(21) Appl. No.: 11/589,623

(22) Filed: Oct. 30, 2006

(65) Prior Publication Data

US 2008/0099616 A1    May 1, 2008

(51) Int. Cl.
*B64C 25/28* (2006.01)
(52) U.S. Cl. .............. 244/109; 244/129.4; 244/119; 414/582
(58) Field of Classification Search .......... 244/129.4, 244/109, 118.2, 119, 129.5, 131, 137.1, 1 R; 414/582
See application file for complete search history.

(56) References Cited

U.S. PATENT DOCUMENTS

| | | | |
|---|---|---|---|
| 3,043,410 A * | 7/1962 | Pearson | 403/322.3 |
| 3,150,849 A * | 9/1964 | Conway et al. | 244/100 R |
| 4,395,000 A | 7/1983 | Deviny et al. | |
| 4,593,871 A | 6/1986 | Nichols | |
| 4,621,780 A | 11/1986 | Doyhamboure et al. | |
| 4,680,891 A | 7/1987 | Perkins | |
| 5,427,329 A * | 6/1995 | Renzelmann et al. | 244/49 |
| 5,735,487 A * | 4/1998 | Abild et al. | 244/129.5 |
| 7,387,276 B1 * | 6/2008 | Smith et al. | 244/118.1 |
| 7,445,180 B2 | 11/2008 | Plude et al. | |

* cited by examiner

*Primary Examiner*—Michael Carone
*Assistant Examiner*—Michael Kreiner

(57) ABSTRACT

An electrical interlock and indication system for use with an aircraft having a hinged tail section is provided. The interlock and indication system prevents operation of a latch/lock actuation system of the hinged tail section unless a tail support is engaged to the tail section, inhibits over rotation of the hinged tail section, and detects retraction failures of latch pins located in the hinged tail section.

20 Claims, 11 Drawing Sheets

FIG. 2A
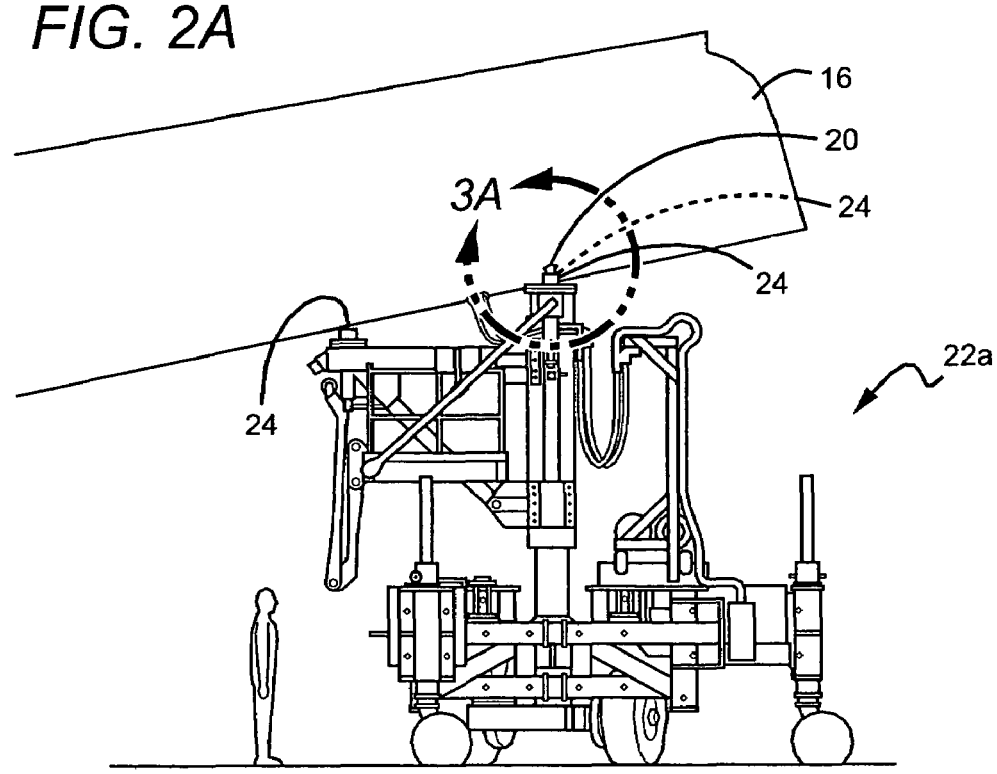
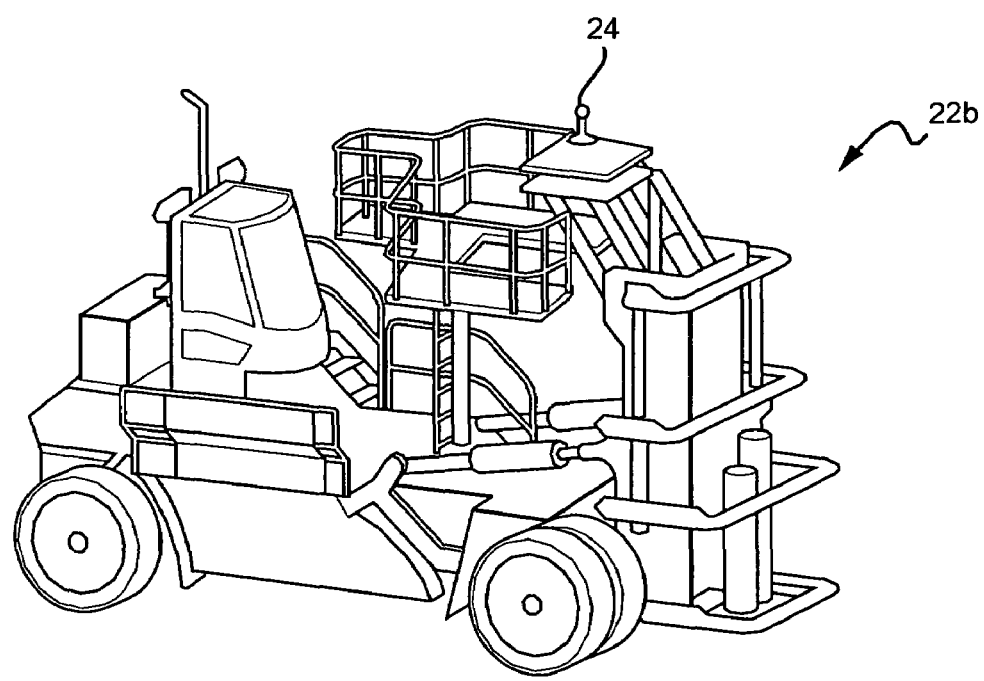
FIG. 2B

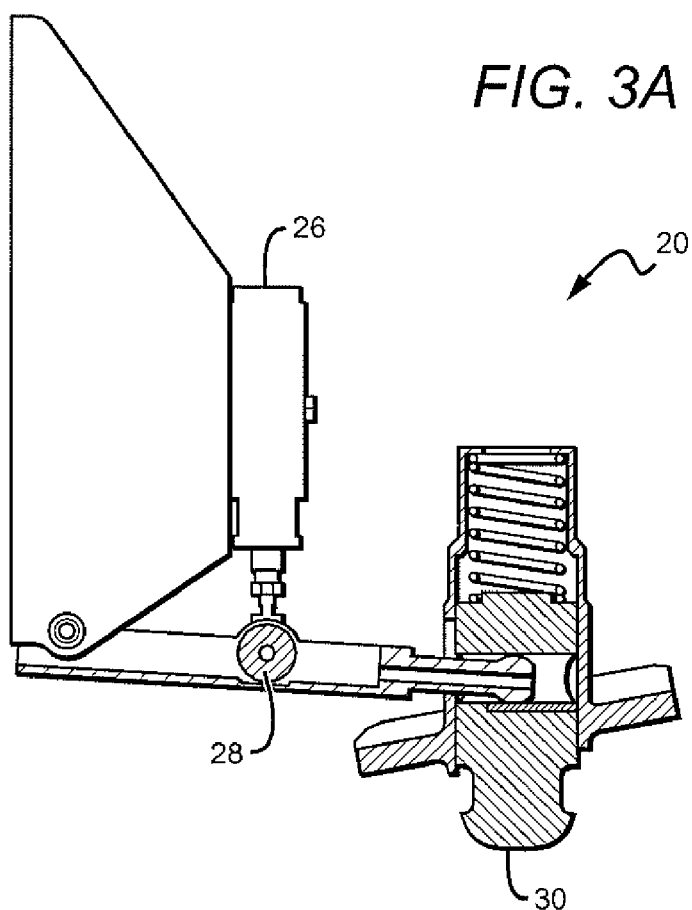
FIG. 3A
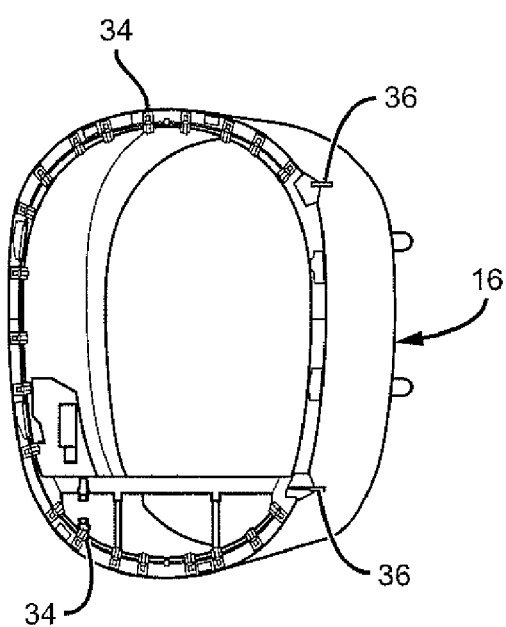
FIG. 4
| FIG. 5A |
| FIG. 5B |
FIG. 5

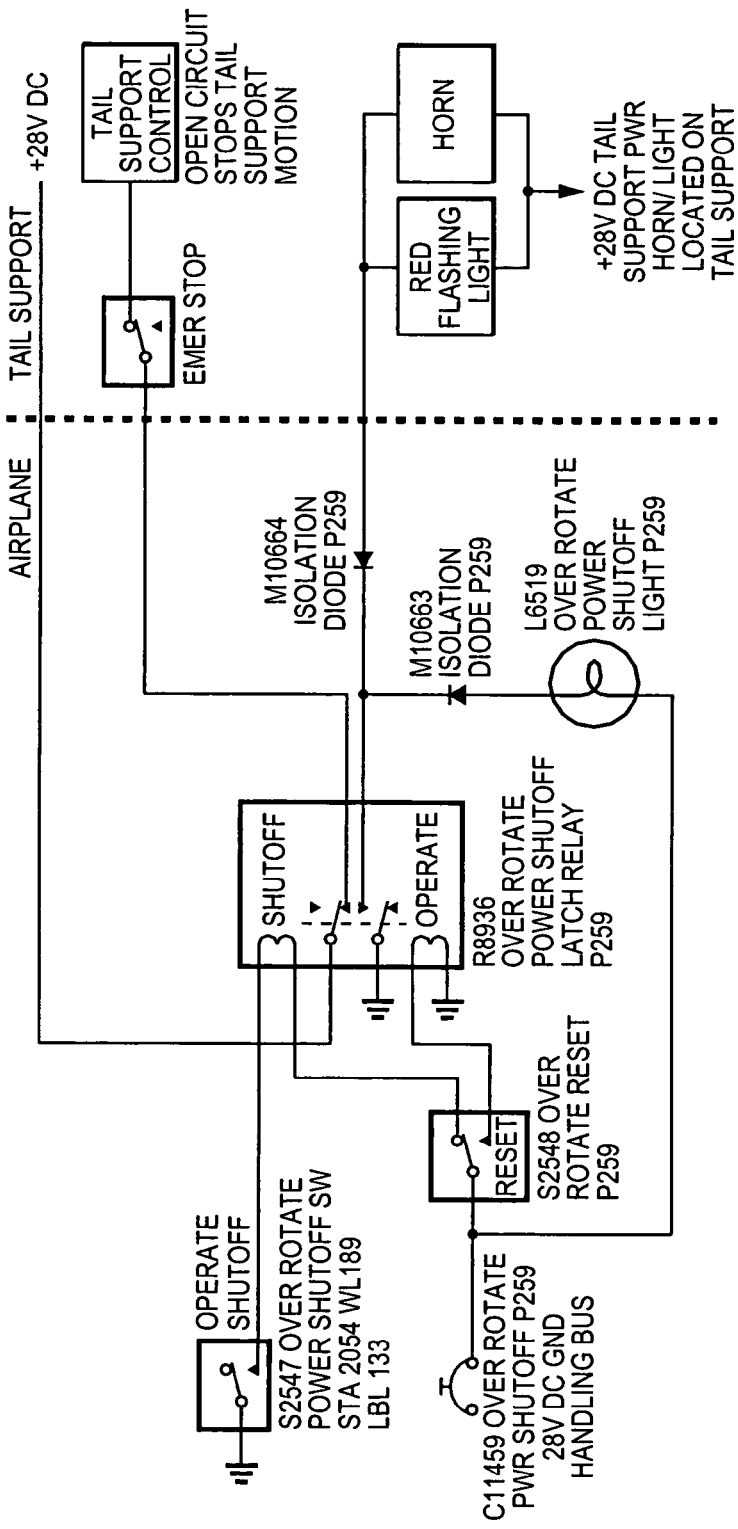

ELECTRICAL INTERLOCK AND INDICATION SYSTEM FOR AIRCRAFT

BACKGROUND OF THE INVENTION

1) Field of the Invention

An electrical interlock and indication system for use with aircraft is provided. More particularly, an electrical safety interlock and indication system for use with the tail section of large cargo transport aircraft is provided.

2) Description of Related Art

Aircraft fuselage, wing parts, and other aircraft cargo are often transported from one location to another via boat, railroad, or other aircraft. Boat and railroad transport often takes much longer and is more expensive than aircraft transport, and thus, aircraft transport is the preferred mode of transportation. Large cargo transport aircraft may be used to transport aircraft fuselage sections, wing parts, and other cargo to and from various locations. Certain cargo transport aircraft include a tail section located in the aft portion of the aircraft that may be opened and closed with various known systems to allow access to the aircraft for loading and unloading of cargo. One such known system includes a tail section that uses a caster-type strut to support the movable fuselage section. However, vertically hinged tail fuselage sections supported by a caster-type strut may have problems opening and closing under windy conditions. Under windy conditions the loads required to open or close the tail section are large, and such struts provide minimal ability to hold the tail section open and have limited or no braking capability. Another known system includes totally disconnecting the tail section from the fuselage and putting it on a cart while the aircraft is being loaded or unloaded. However, this system is time consuming and requires special equipment to hold the tail section while the aircraft is being loaded or unloaded. Another known system includes means to latch and lock the tail section where the latches are arranged in such a way that the forces caused by in-flight deflections can cause unlatching. Such unexpected unlatching can cause catastrophic accidents during flight. Moreover, for aircraft such as the 747 LCF, when the aircraft is not in flight and on the ground, such unexpected unlatching can cause the tail section to over rotate, fracture the hinge fittings, and separate from the main fuselage, damaging the tail section and wing beyond repair.

In addition, it is often necessary to inspect latch pins, hinges and related attach structures located in the hinged tail section to detect any faults or failures with such structures. Manual visual inspection of the tail section structures is time consuming and may involve hours or days of time to inspect due to the extreme height of the aircraft and the necessity to use special equipment to access the tail section structures. Moreover, visual inspection of the latch pins, hinges and related attach structures is difficult, if not impossible, with the tail section closed, even with the use of remote viewing equipment. For example, the use of scissor lifts or similar type equipment to access such structures with the tail section closed is not possible.

In addition, there may be a problem with over rotation of the tail section with known systems. Over rotating the tail section can cause damage to hinges and/or fuselage and the tail section that the hinges attach to. Moreover, if the tail section over rotates, damage can occur to the aircraft, equipment, personnel, and cargo.

Accordingly, there is a need for an improved electrical interlock and indication system for use with the tail section of large cargo transport aircraft that does not have the problems associated with known systems and devices.

SUMMARY OF THE INVENTION

This need for an improved electrical interlock and indication system for use with the tail section of large cargo transport aircraft that does not have the problems associated with known systems, as well as a unique, nonobvious, and advantageous system, is satisfied. None of the known systems provides all of the numerous advantages discussed herein. Unlike known systems, the electrical interlock and indication system for use with the tail section of large cargo transport aircraft provides the following advantages: provides a practical and economical interlock and indication system to assure safe operation of the tail section; provides an interlock and indication system that reduces the potential for damage to the aircraft, equipment, personnel, and cargo; provides an interlock and indication system that assures that the latch/lock actuation system normal controls cannot be used to unlatch, unlock, and release the tail section without a tail support attached to the tail section; provides an interlock and indication system that prevents and detects over rotation of the tail section, which in turn, prevents damage to the tail section and fuselage; provides an interlock and indication system that prevents and detects potential damage to latch pins, hinges, and related attach structures located in the tail section by detecting latch pins that fail to fully retract prior to opening of the tail section and by detecting latch pins that fail to remain retracted while the tail section is open; provides an interlock and indication system that avoids costly and difficult visual inspections of the latch pins, hinges and related attach structures in the tail section that would have to be made manually; provides a system that significantly reduces the cost of transport by air as compared to the cost associated with water and rail transportation; provides a system that is compliant with the current Federal Aviation Administration (FAA) regulations concerning aircraft designs; provides a system that efficiently transports fuselage and wing sections from various locations in the world by providing an actuation system to open and close the tail section on aircraft; provides a system to prevent unlocking, unlatching, and release of the tail section until the tail support is both attached to the tail section and is properly pressurized; and provides a system that uses a tail support that communicates with the pull-in, latching and locking functions so that the tail support unloads the majority of deflection loads during operation, and the forces the pull-in and latch pin actuators must generate are greatly reduced and the aircraft structure can be optimized to reduce weight.

In one embodiment of the invention, there is provided an interlock and indication system for use with an aircraft having a hinged tail section, wherein the interlock and indication system prevents operation of a latch/lock actuation system of the hinged tail section unless a tail support is engaged to the tail section, wherein the interlock and indication system inhibits over rotation of the hinged tail section, and wherein the interlock and indication system detects retraction failures of latch pins located in the hinged tail section.

In another embodiment of the invention, there is provided an interlock and indication system for use with an aircraft having a hinged tail section, wherein the interlock system comprises: an interlock signal subsystem; an over rotation power shutoff subsystem; an over rotation indication subsystem; and, a latch pin fault detection subsystem. Preferably, the interlock signal subsystem prevents operation of a latch/lock actuation system of the tail section unless a tail support is engaged to the tail section. Preferably, the over rotation power shutoff subsystem prevents the tail support from over rotating the tail section. Preferably, the over rotation indication subsystem indicates if the tail section has over rotated. Preferably, the latch pin fault detection subsystem detects retraction failures of latch pins located in the hinged tail section.

BRIEF DESCRIPTION OF THE DRAWINGS

The foregoing and other advantages and features, and the manner in which the same are accomplished, will become more readily apparent upon consideration of the following detailed description taken in conjunction with the accompanying drawings which illustrate preferred and exemplary embodiments, but which are not necessarily drawn to scale, wherein:

FIG. 2A is a perspective view illustrating a first version of a tail support attached to the tail section of the aircraft that may be used in one embodiment of the invention;

FIG. 2B is a perspective view illustrating a second version of a tail support that may be used in another embodiment of the invention;

FIG. 3A is an enlarged side view in partial cross-section taken along circle 3 of FIG. 2A illustrating an interlock valve and mechanism configuration that is used with the first version of the tail support in FIG. 2A;

FIG. 4 is a perspective view illustrating the tail section latching and locking hardware;

FIG. 8 is a schematic drawing of the over rotation power shutoff subsystem of one embodiment of the invention; and, FIG. 9 is a schematic drawing of the over rotate indication subsystem of one embodiment of the invention.

DETAILED DESCRIPTION OF THE INVENTION

Embodiments of the invention now will be described more fully hereinafter with reference to the accompanying drawings, in which some, but not all embodiments of the invention are shown. Indeed, several different embodiments may be provided and should not be construed as limited to the embodiments set forth herein. Rather, these embodiments are provided so that this disclosure will be thorough and complete and will fully convey the scope of the invention to those skilled in the art. Like numbers refer to like elements throughout.

One embodiment of the invention provides for an interlock and indication system for use with an aircraft having a hinged tail section. The interlock and indication system prevents operation of a latch/lock actuation system of the hinged tail section unless a tail support is engaged to the tail section. The interlock and indication system prevents the tail support from moving or driving the tail section open or closed without the tail section in the proper position. Further, the interlock and indication system inhibits over rotation of the hinged tail section. Further, the interlock and indication system detects retraction failures of latch pins located in the hinged tail section.

Figure 1:
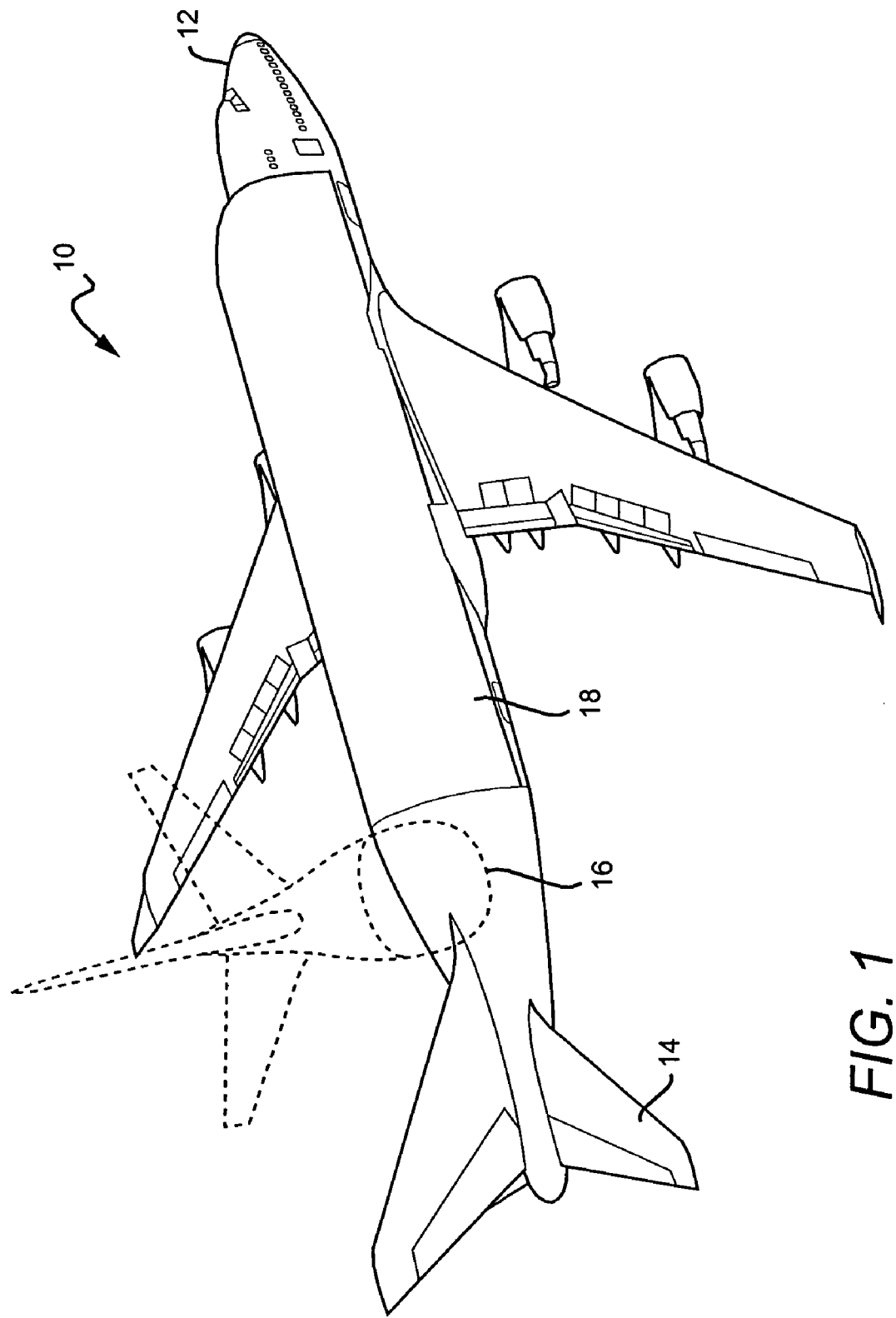
FIG. 1 is a perspective view illustrating a cargo transport aircraft showing in phantom lines a tail section of the aircraft in an open position.
Figure 3B:
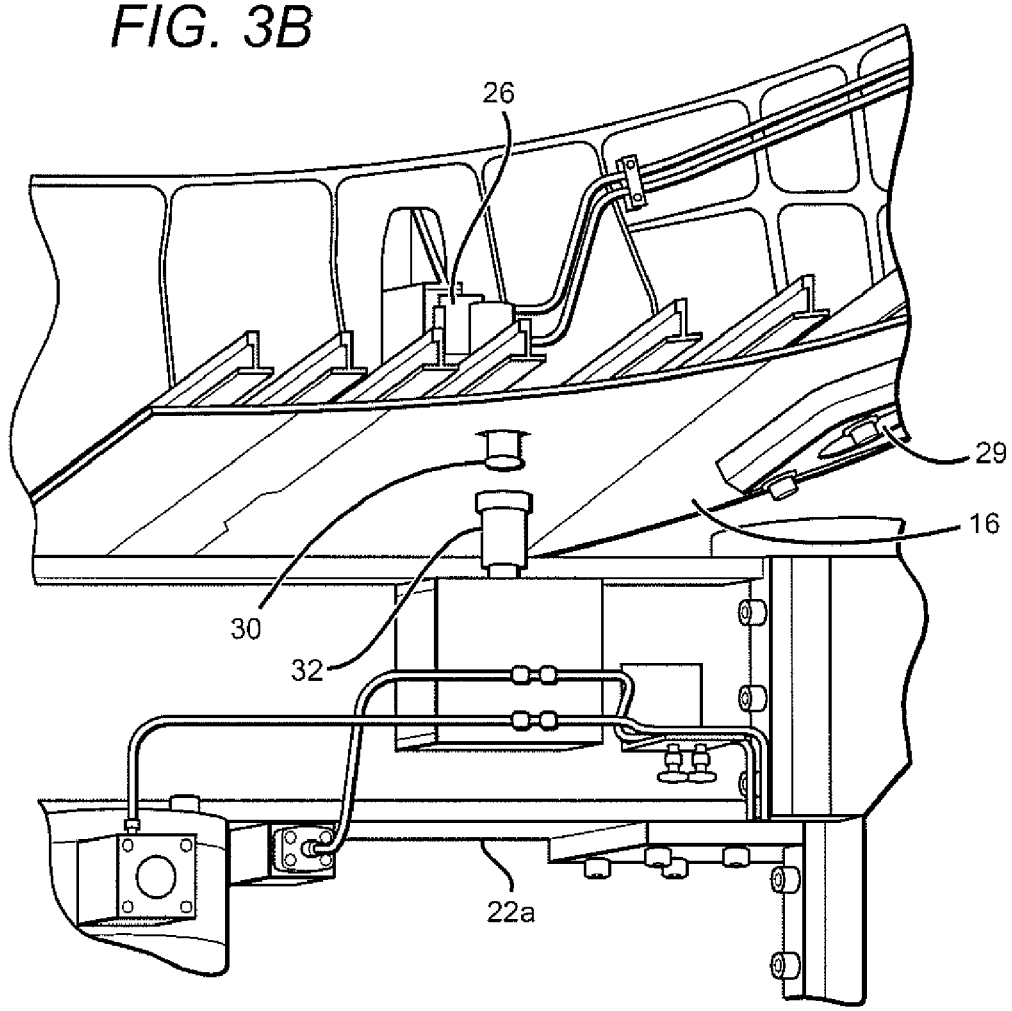
FIG. 3B is a rear view of the interlock component and tail support interface that is used with the first version of the tail support in FIG. 2A.
Figure 5C:
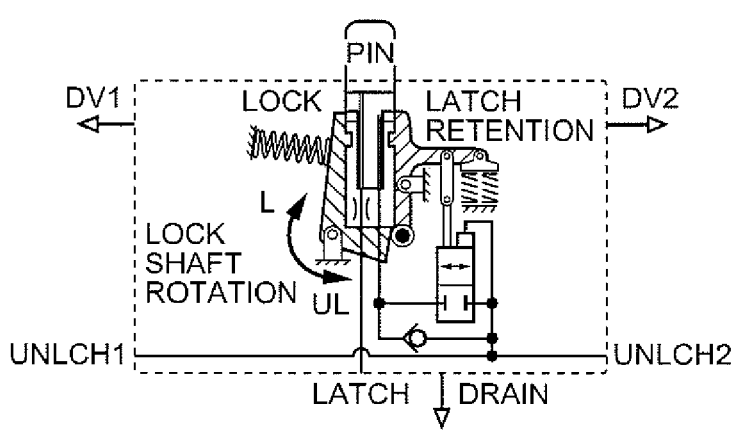
FIG. 5C is an enlarged view of a pin and FIG. 5D is an enlarged internal view of a lock actuator.
Figure 5A:
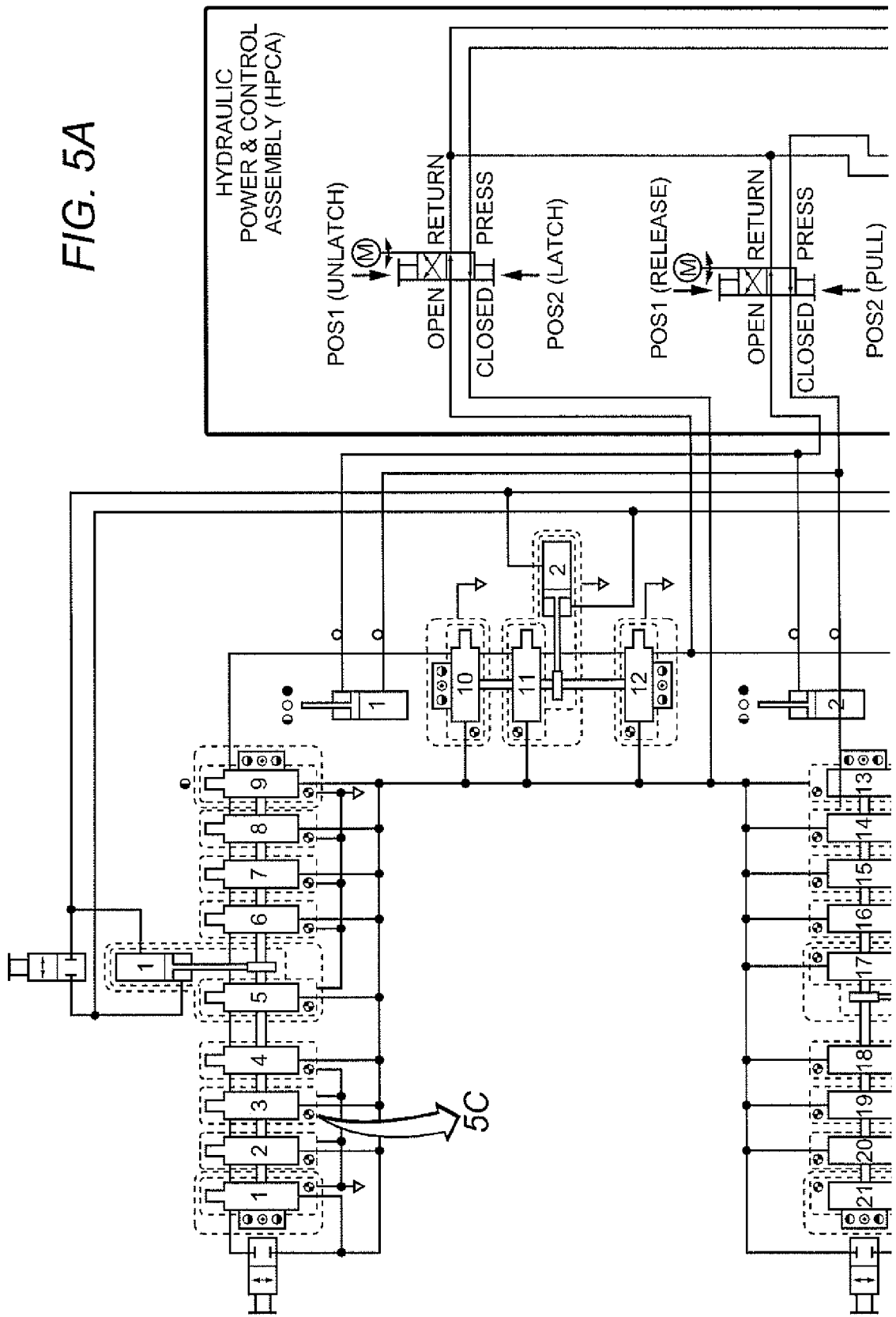
FIG. 5 (includes FIG. 5A, FIG. 5B, FIG. 5C, and FIG. 5D) is a schematic drawing of the latch/lock actuation system of one embodiment of the invention, where
Figures 5B, 5D:
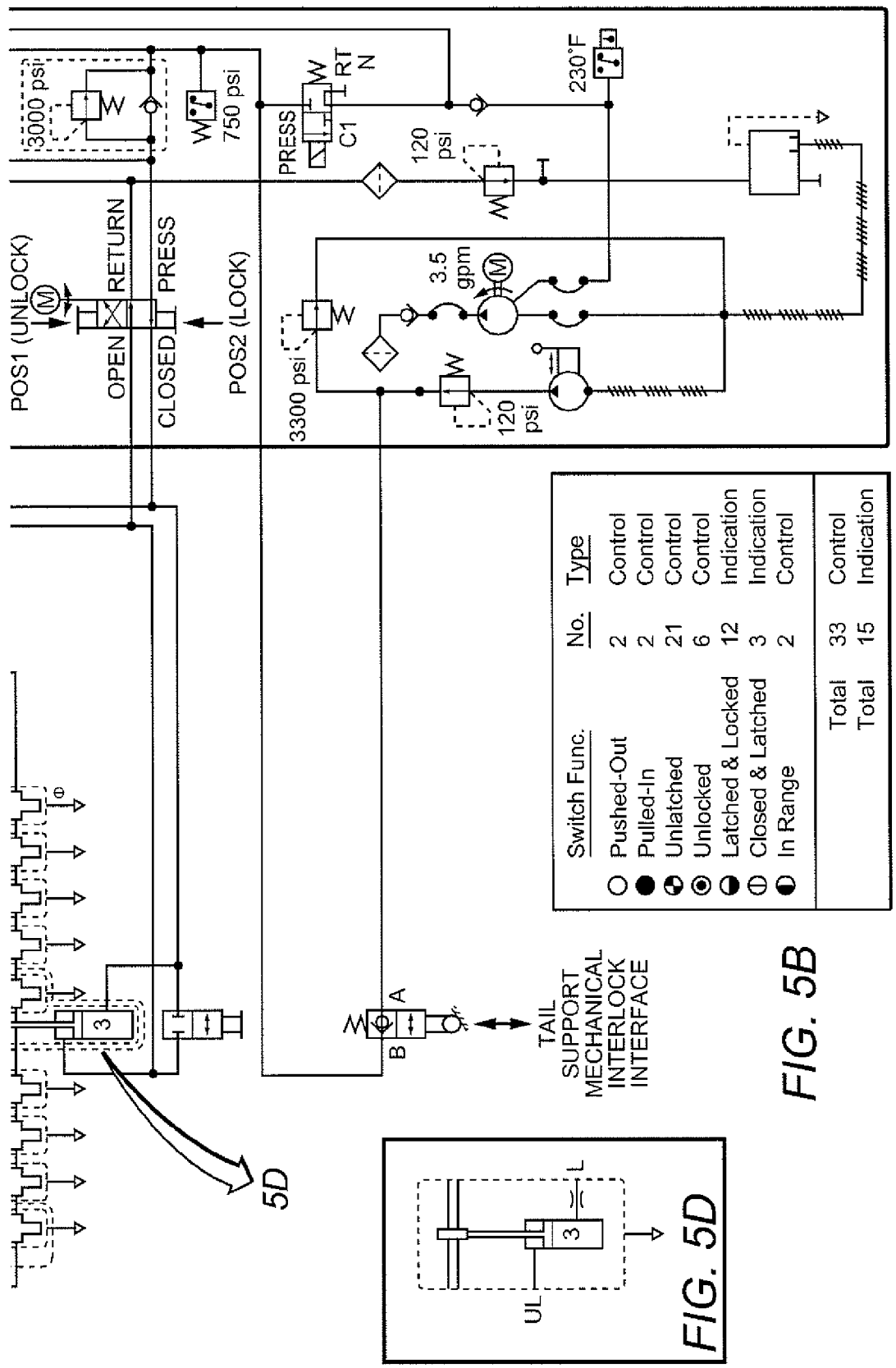

Referring now to the drawings, FIG. 1 shows a perspective view illustrating a cargo transport aircraft 10 having a nose 12 and a tail 14. A vertically hinged tail section section 16 of an aircraft fuselage portion 18 is shown in phantom lines in an open position. The tail section allows access to the aircraft for loading and unloading of cargo. As shown in FIG. 2A, the tail section incorporates a lock/latch actuation system comprising at least one interlock component 20 that engages or interfaces with a first version of a powered, tail support 22a to effect operation of the system when the tail support 22a is attached to the tail section 16 of the fuselage portion 18. There may be more than one interlock component located on the tail section. The latch/lock system pulls in, latches, and locks the tail section during closing of the tail section, and the latch/lock system unlocks, unlatches, and releases the tail section during opening of the tail section. The tail support provides support, motive force, and restrains the hinged tail section during cargo loading and unloading operations. The tail support is a ground service equipment that has its own propulsion system, operator controls, and power source independent of the aircraft and that provides the power to open and close the tail section, while supporting the weight of the tail section and providing restraint when the tail section is open. The tail support restrains the tail section against wind loads when the tail section is in an open position. In addition, the tail support minimizes fuselage deflections and resultant latching loads. The tail support in FIG. 2A has three attachment components 24, and the three attachment components may be engaged with the tail section when the system is in operation. FIG. 2A specifically shows two of the three attachment components 24 from a side view of the aircraft, and the third attachment component (with lead line in phantom) is behind the attachment component shown to the right in FIG. 2A. One attachment component is on the centerline of the aircraft and this is shown to the left in FIG. 2A. The other two attachment components, when viewed from the front of the aircraft, are opposite each other with one being on the right side of the tail section of the aircraft and the other being on the left side of the tail section of the aircraft when the tail support is attached to the tail section. The three attachment components form a tripod. To keep from loading the tail section, smaller caster wheels are raised once the tail support is engaged and larger drive wheels are steered. The drive wheels track in a circle when opening the tail section so there is only minimal tendency for the upper platform of the tail support to rotate relative to the lower drive mechanism. Vertical travel is absorbed by a strut. FIG. 3A is an enlarged side view in partial cross-section taken along circle 3A of FIG. 2A illustrating the interlock component 20 having an interlock valve 26, a roller 28, and a plunger linkage 30. The plunger linkage 30 extends outwardly from the interior of the swing. The interlock component may or may not be integrated with an attachment component in the tail support in FIG. 2A. FIG. 3B is a rear view of the interlock component and tail support interface. FIG. 3B shows the tail section 16, tail support 22a, interlock valve 26, and plunger 30, and an actuator 32. The actuator 32 depresses the plunger linkage when the tail support is attached to the tail section. The location of the plunger is fixed relative to the actuator on the tail support 22a by the three attachment components 24. Each attachment component 24 is inserted into a respective socket 29 located on the tail section. FIG. 2B is a perspective view illustrating a second version of a tail support 22b, Although tail support 22a is shown in FIG. 3B, tail support 22b may also be use with the interlock component shown in FIG. 3B. With tail support 22a, if a flat plate is attached to the top of the actuator that pushes the plunger, as the tail swings, it will still be in contact with the plunger. The tail support 22b has one attachment component 24 for attaching the tail support to the tail section when the system is in operation. To operate the latch/lock actuation system, the tail support must be mechanically and electrically engaged or connected to the tail section of the aircraft. The tail support supports the tail section when it is open, holds it in position, and provides the motive force for opening and closing the tail section. If the tail section were unlatched and unlocked without the tail support attached, the tail section would swing open uncontrolled, potentially resulting in significant damage to the aircraft. Because of the tail section's size, the aircraft structure cannot be designed to limit opening of the tail section or to survive uncontrolled opening of the tail section if the tail section were to be unlatched, unlocked, and released without the tail support attached to the tail section. The tail support provides operational power and programmable logic controller (PLC) signal communication to the aircraft tail section. FIG. 5 (includes FIG. 5A, FIG. 5B, FIG. 5C, and FIG. 5D) is a schematic drawing of the latch/lock actuation system used with one embodiment of the invention.

Figure 6A:
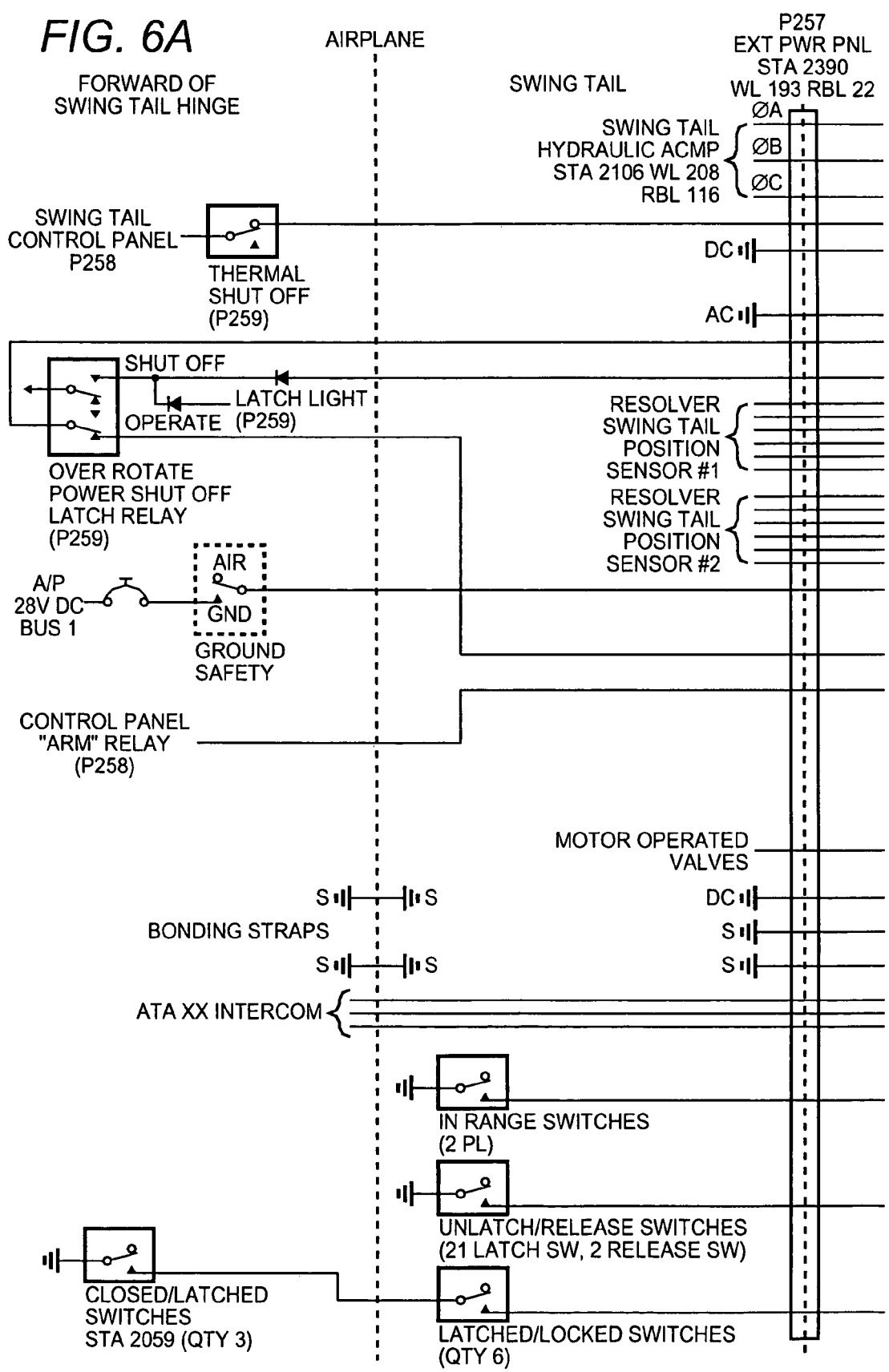
FIG. 6 (includes FIG. 6A and FIG. 6B) is a schematic drawing of the interlock signal subsystem of one embodiment of the invention.
Figure 6B:
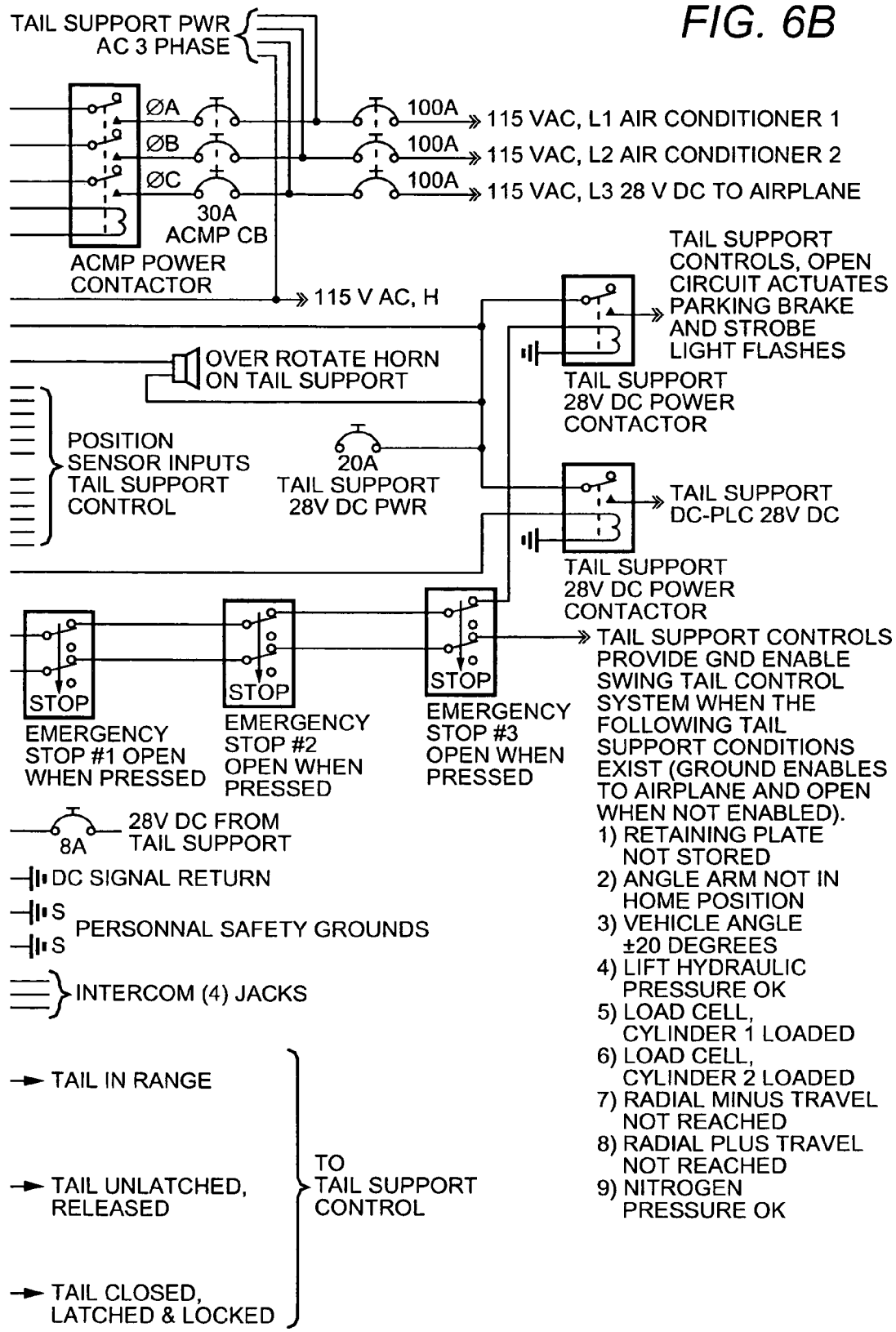

One embodiment of the invention provides for an interlock signal subsystem that prevents operation of the latch/lock actuation system of the tail section unless a tail support is engaged to the tail section. In particular, the interlock signal subsystem prevents unlocking, unlatching, and releasing of the tail section on the ground without the tail support in position and attached to the tail section. FIG. 6 (includes FIG. 6A and FIG. 6B) is a schematic drawing of the interlock signal subsystem of one embodiment of the invention. The interlock signal from the tail support to the latch/lock actuation system prevents the unlocking and unlatching of the tail section using the electrical control system unless the tail support is engaged with or attached to the tail section. Similarly, the interlock signal from the latch/lock actuation system prevents the tail support from driving the tail section open or closed unless all latch pins are in the fully retracted position and the pull-in hooks are in the released position. Unlocking, unlatching, and releasing the tail section without the tail support in position can result in uncontrolled opening of the tail section resulting in the tail section over rotating until it strikes the wing or fuselage resulting in irreparable damage to the aircraft and potential injury or death to ground personnel. The latch/lock actuation system is prevented from operating in flight by removal of all potential electrical power supplies to operate the latch/lock actuation system normal controls and to power the system's alternating current motor pump. The interlock component 20 interfaces with the tail support 22a or 22b, such that actuation, preferably hydraulic actuation (both normal and manual backup), cannot be accomplished unless the tail support is attached to the tail section of the fuselage portion, is capable of supporting the fuselage weight, and is capable of restraining the movable section of fuselage against wind loads.

The normal latch/lock actuation system controls are electrical. In order to prevent operation of the latch/lock system's normal controls unless the tail support is attached to the tail section, an interlock signal is required from the tail support. The interlock signal operates an "arm" relay that provides power to the latch/lock system's normal controls. The interlock signal signifies that the tail support is properly attached and locked to the tail section and is ready to support and restrain the tail section to prevent uncontrolled opening of the tail section. The interlock signal from the tail support is only active when the following plurality of activation conditions have been met: (1) retaining plate not stored; (2) angle arm not in home position; (3) vehicle angle/20 degrees; (4) lift hydraulic pressure acceptable; (5) load cell, cylinder 1 loaded; (6) load cell, cylinder 2 loaded; (7) radial minus travel not reached; (8) radial plus travel not reached; (9) nitrogen pressure acceptable. When these conditions are satisfied, a ground signal is provided from the tail support to the latch/lock actuation system's normal control circuits to activate the arm relay that allows the control circuits to be powered from a ground electrical bus. The precise set of conditions that must be met to assure that the tail support is properly attached to the tail section and is ready to support and restrain the tail section is dependent on the design of the tail support. The conditions are unique to the tail support as shown in FIG. 2B. Similar criteria may be developed for alternative tail support designs.

Control of the tail section actuation system is electrical with sequencing and indication provided by hermetically sealed limit switches. Indication of the tail section latch/lock actuation system status is provided to the latch/lock system operator, the flight deck, and a tail support operator. The tail support is not part of the latch/lock system. However, it is integral to the operation of the latch/lock system. The tail support provides electrical power to the latch/lock system's alternating current motor pump and motor operated valves and provides an interlock signal to the latch/lock system to prevent unlatching of the tail section if the tail support is not in place. For the tail support to be enabled, the aircraft air/ground system must be in the ground mode and the aircraft power system must be energized. A redundant system of two tail position transmitters mounted at the hinge centerline between two intermediate hinges provide tail section angle data to the tail support for positional and speed control.

FIG. 4 is a perspective view illustrating the tail section latching and locking hardware. The tail section latching and locking hardware secures the tail section 16 to the fuselage portion 18 when the tail section is closed. The tail section 16 incorporates a plurality of latch pins 34 in a radial arrangement around the periphery of the tail section. The latch pins are oriented in the radial arrangement in order to isolate the latch pins from unlatching forces due to in-flight deflections. The tail section 16 pivots open on hinges 36. A weather seal (not shown) around the periphery provides environmental sealing between the fuselage portion 18 and the tail section 16. Preferably, the tail section has twenty-one (21) approximately equally spaced latch pins located on the tail section peripherally around the fuselage break, excluding the left side between the hinges. The latch pins engage interfacing lugs mounted on the fuselage to latch the tail section closed. The latch pins are oriented such that they are normal to the skin of the aircraft to isolate the latch pins from unlatching forces due to in-flight deflections. The latch pins and hinges carry flight and ground loads when the tail section is closed and latched. Hydraulic actuation of the latch pins is prevented or blocked by the interlock component 20 if the support for the hinged section of the fuselage is not attached and supporting the weight of the hinged section of the fuselage. Since the hinge centerline has a two degree cant, if the tail section were to be unlocked, unlatched, and released, the tail section would act like a pendulum and begin opening. If this were allowed, the typically 48,000 pound tail section would over rotate, fracture the hinge fittings, and separate from the main fuselage damaging the tail section and wing beyond repair. Therefore, a system to prevent unlocking, unlatching, and release of the tail section until the tail support is attached to the tail section is provided. The system to latch and lock the tail section has the latches arranged such that the forces caused by in-flight deflections do not tend to cause unlatching. The latch pins are arranged so that the pin axis is normal to the skin (i.e., radial) rather than tangential. In addition to each latch having a lock, each latch also has a latch retention means capable of holding the latch in the latched position independent of the locks. Finally, each lock is not subjected to latching loads.

Figure 7:
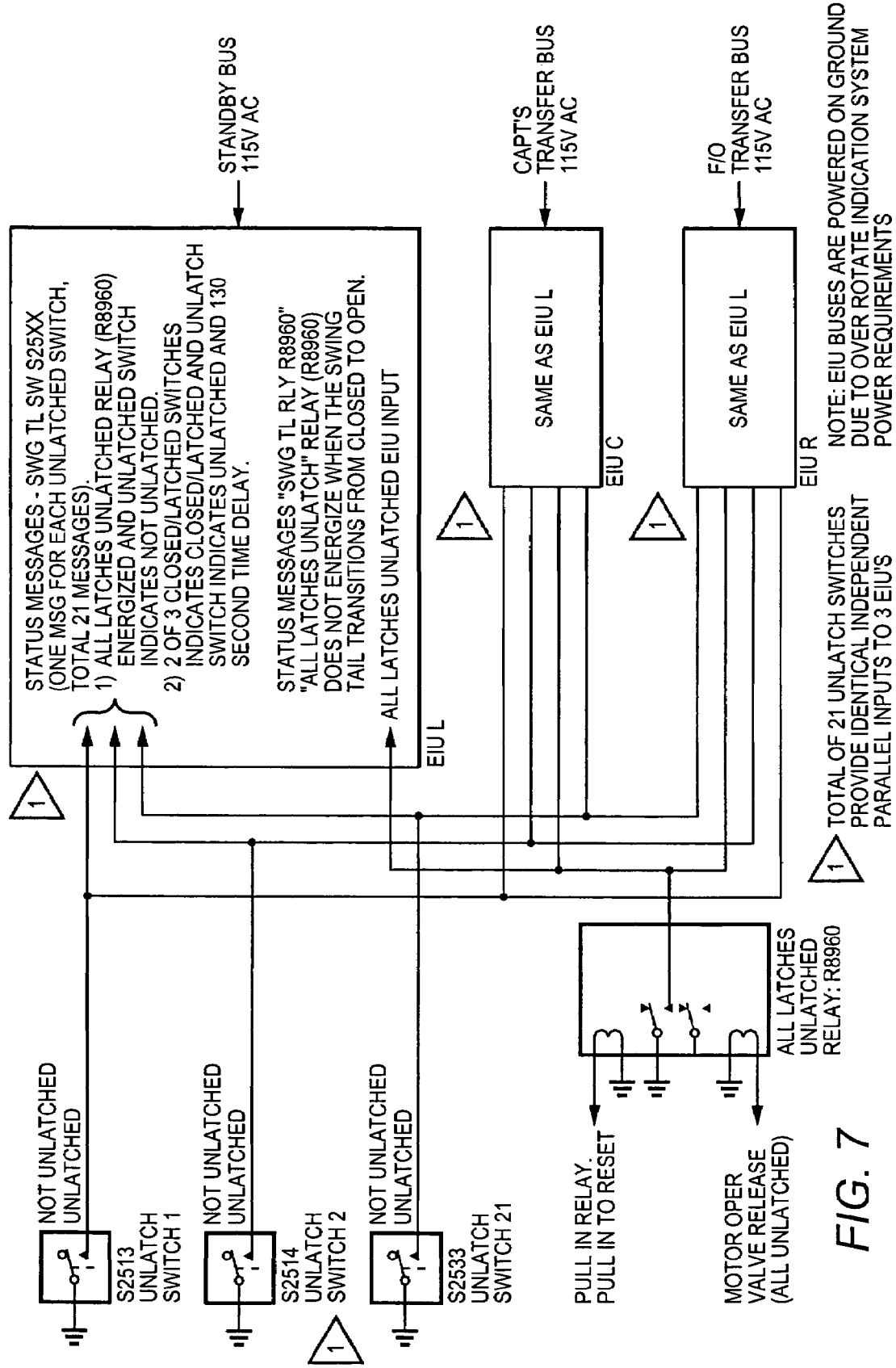
FIG. 7 is a schematic view of the latch pin fault detection subsystem of one embodiment of the invention.

The interlock and indication system further comprises a latch pin fault detection subsystem that detects retraction failures of latch pins located on the tail section. FIG. 7 is a schematic view of the latch pin fault detection subsystem of one embodiment of the invention. Moving or driving the tail section open or closed without all of the latch pins fully retracted can cause damage to the latch pins, hinges, their support structures, or their interfacing lugs. Damage to two or more latch pins, interfacing lugs, or their supporting structures can result in a failure to hold the tail section closed in-flight resulting in the loss of the aircraft. Damage to the latch pins, latch pin lugs, hinges, or the support structure for the latches and hinges reduces the structural integrity of the aircraft and can result in the loss of the aircraft. Because of the tail section's size, potential damage to the latch pins, latch pin lugs, hinges, or their attachment structures cannot be detected by simple visual inspections. The latch pin fault detection subsystem detects and prevents potential damage to these key elements. The latch pin fault detection subsystem detects latch pins that fail to fully retract prior to opening of the tail section or latch pins that fail to remain retracted while the tail section is open. In order to accomplish this, each latch pin is equipped with an unlatched limit switch installed in the base of a latch pin housing. The unlatched switches are hermetically sealed, plunger actuated switches. Each unlatched switch is actuated when its respective latch pin is retracted sufficiently to clear its interfacing latch pin lug. All 21 of the unlatched limit switches are wired in series to control releasing of the tail section. When all 21 unlatched limit switches are depressed to the unlatched position the pull-in/release motor operated valve is commanded to the release position. The pull-in/release motor operated valve then ports hydraulic pressure to both pull-in hook actuators to retract the two pull-in hooks to the release position to allow the tail section to be opened. Additionally, a ground signal to the tail support is routed through the unlatched limit switches on a separate set of contacts to signal the tail support that all of the latch pins are retracted and through two released switches to indicate that the release hooks are in the released position. If the tail support does not receive the unlatched signal, it will not move or drive the tail section open or closed. This prevents operation of the tail support to open or close the tail section if any one of the 21 latch pins in not retracted. In order to detect contact failures in the unlatched limit switches that could erroneously command the pull-in/release motor operated valve to the release position and simultaneously signal the tail support that all of the latch pins are retracted, each unlatched switch provides a ground signal to the EICAS (Engine Indication and Crew Alerting System) Interface Units (EIUs) when the switch is in the unlatched state This is then compared to the state of an all latches unlatched relay. The all latches unlatched relay is actuated to the all latches unlatched state by the signal to the pull-in/release motor operated valve to command the pull-in/release motor operated valve to release the tail section. This relay provides the EIUs with a ground signal that indicates the tail section is not latched. The EIU compares the state of the all latches unlatched relay to the individual inputs from each unlatch switch and generates a switch specific status message if there is a disagreement between the unlatched switch state and the all latches unlatched relay state. In order to detect failures of the unlatched signals to the EIUs, the EIUs also compare the state of the unlatched limit switches to the closed/latched limit switches. If any unlatched limit switches indicates unlatched 130 seconds after two or more of the closed/latched limit switches indicate that the tail section is closed and latched, then a message is displayed indicating a failure of the unlatched limit switch. The EIUs also monitor the all latches unlatched relay to detect failure of the all latches unlatched relay. If the all latches unlatched relay fails to transition from the not unlatched state to the all latches unlatched state when the tail section is opened, then a message is generated indicating a failure of the all latches unlatched relay.

One embodiment of the invention further comprises an over rotation shutoff subsystem. FIG. 8 is a schematic drawing of the over rotation power shutoff subsystem of one embodiment of the invention. Over rotating the tail section can cause damage to the hinges and/or fuselage and tail structure that the hinges attach to. The over rotation shutoff subsystem prevents the tail support from over rotating the tail section. In particular, the over rotation shutoff subsystem prevents the tail support from moving or driving the tail section past 95 degrees. The over rotation power shutoff subsystem utilizes one hermetically sealed electromechanical switch, OVER ROTATE POWER SHUTOFF S2547, mounted at the tail section lower hinge, to detect over rotation. If the tail section is driven by the tail support to 95 degrees, this switch is depressed energizing the OVER ROTATE POWER SHUTOFF LATCH RELAY R8936 on the tail section Status Panel P259 (which is located at the forward edge of the aft lower lobe cargo door cutout), to the shutoff position. This latching relay will remain in the shutoff position (latched), even if power to the relay is subsequently lost. This relay, in the shutoff position, will open a 28 volt DC (direct current) signal to the tail support causing the tail support brakes to be applied. In addition, there is a flashing red light and horn located on the tail support that will activate to alert the operator that over rotation power shutoff has occurred.

In order to allow the tail support to resume powered operations, the OVER ROTATE POWER RESET SWITCH S2548, on the tail section Status Panel P259, is momentarily depressed. This toggles the latch relay from the shutoff position to the operate position allowing the tail support to resume powered operation in the closing direction. If the tail section OVER ROTATE POWER SHUTOFF SWITCH S2547 remains in the over rotation position, the latch relay, R8936, will immediately toggle back to the shutoff position after being reset. In this case the operator will need to continuously depress the reset switch S2548 until the tail section is rotated out of the over rotation position (less than 95 degrees) resulting in the latching relay remaining in the operate position. The status of the latch relay is indicated by the OVER ROTATE POWER SHUTOFF LIGHT L6519 located at the top of the tail section Status Panel P259. This light will illuminate red when the latch relay is latched in the power shutoff position. The position of the OVER ROTATE POWER SHUTOFF SWITCH S2547 is indicated by the OVER ROTATE POWER SHUTOFF SW light L6555 located behind the door on the tail section Status Panel P259. This light will illuminate white when the OVER ROTATE POWER SHUTOFF Switch S2547 is depressed. These status lights on the tail section Status Panel, P259 are tested by actuating the LAMP TEST SWITCH S2549, also located on the tail section Status Panel P259.

Figure 9:
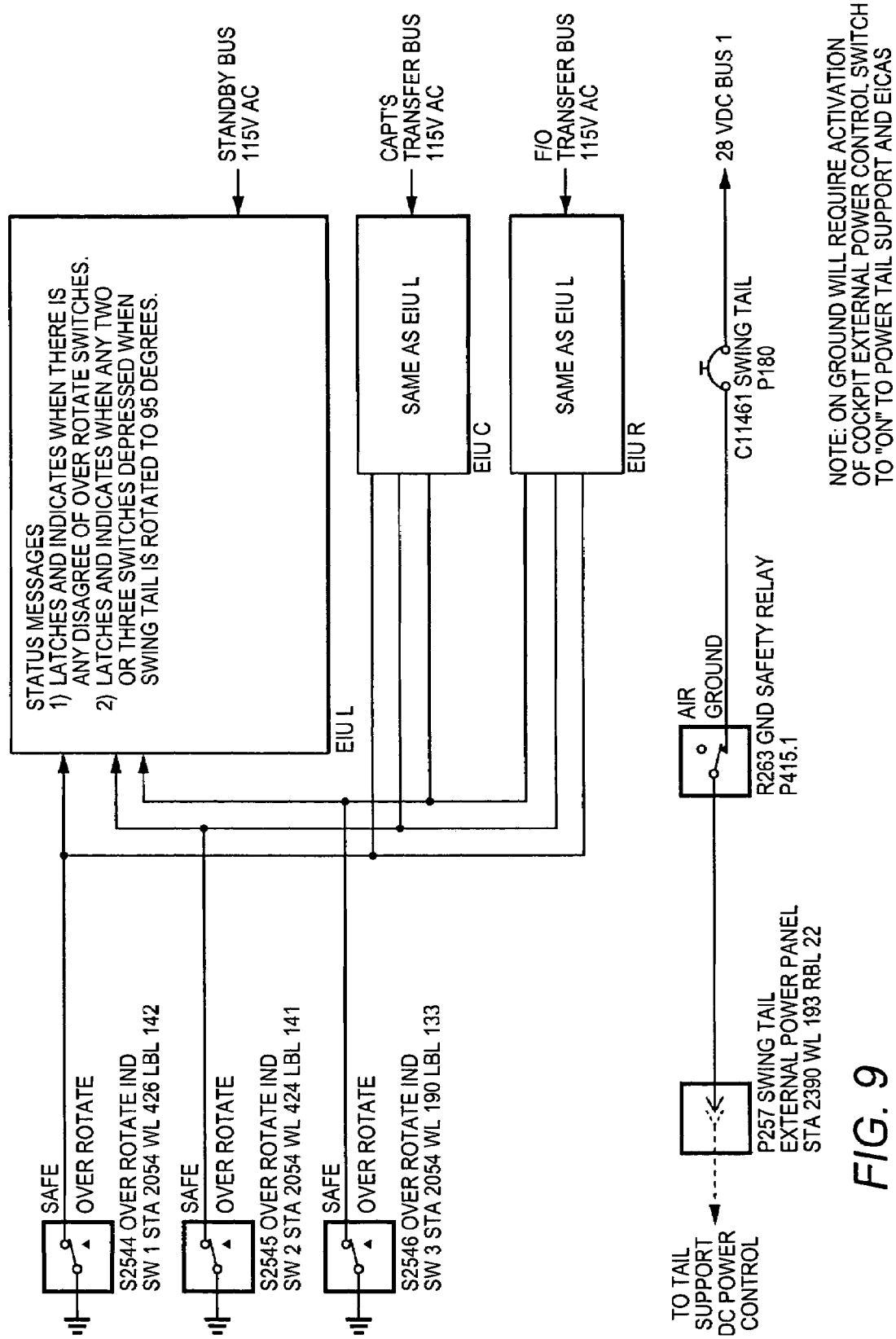

One embodiment of the invention further comprises an over rotation indication subsystem. FIG. 9 is a schematic drawing of the over rotation indication subsystem of one embodiment of the invention. The over rotation indication subsystem indicates if the tail section has over rotated. In particular, the over rotation indication subsystem indicates if rotation of the tail section 95 degrees or greater has occurred which would then drive inspections to the tail section structure and mechanisms. The over rotation indication subsystem utilizes three hermetically sealed electromechanical switches mounted at the hinge to detect over rotation. These three switches are S2544 OVER ROTATE IND 1 mounted at the upper hinge, S2545, OVER ROTATE IND 2 mounted at the upper hinge, and S2546, OVER ROTATE IND 3 mounted at the lower hinge. S2546, OVER ROTATE IND 3 provides a ground analog discrete input signal to each of the three parallel EICAS Interface Units (EIU) when the tail section is rotated to 95 or more degrees. S2544, OVER ROTATE IND 1 and S2545, OVER ROTATE IND 2 provide open analog discrete input signals to each of the three parallel EIU when the tail section is rotated to 95 or more degrees. If two or three of the switches detect over rotation, an EICAS status message, SWG TL OV ROTATE is latched and displayed on EICAS in the flight deck. The SWG TL OV ROTATE status message is inhibited in the air. Since by procedure, status messages must be cleared before flight, an inspection of the tail section is initiated if an over rotate event is detected. If any one of the three switch outputs to the EIUs disagrees with the other two switches, a system fault status message is generated indicating a system problem. The system fault status messages identify the specific switch that disagrees with the other two. These system fault status messages are SWG TL SW S2544, SWG TL SW S2545, and SWG TL SW S2546. These system fault status messages are active on the ground and in the air. In order for the EIUs to detect tail section over rotation during ground operations, the main aircraft buses must be powered from external power. To insure that the EIUs are powered during ground operations, the tail support direct current (dc) power contactor is energized by 28 volts of direct current (VDC) power from the aircraft main bus. For the tail support to be operational on the ground, the air/ground system must be in the ground mode and the aircraft power system switches must be in the following positions: (1) battery switch is "ON"; (2) stand by power switch in "AUTO" position; and (3) external power switch indicates "ON".

The interlock and indication system allows for efficient transport of fuselage and wing sections of large aircraft, as well as other large cargo, to and from various locations in the world by providing a means to open and close the tail section on the aircraft in order to load and unload the fuselage and wing sections and other cargo. An example of a large aircraft that may be used with one embodiment of the invention is aircraft model 747 LCF. Turn time is minimized by providing a means to pull in, latch, lock, unlock, unlatch, and release a very large vertically hinged section of fuselage. The cost of transport as compared to the cost of transport associated with water and rail transportation is significantly reduced. In addition, by using a tail support that communicates with the pull in, latching, and locking functions, such tail support unloads the majority of deflection loads during operation so that the forces the pull in and latching actuators must generate is greatly reduced and the aircraft structure can be optimized to reduce weight.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed that modifications and other embodiments are intended to be included within the scope of the appended claims. Although specific terms are employed herein, they are used in a generic and descriptive sense only and not for purposes of limitation.

What is claimed is:

1. An interlock and indication system for use with an aircraft having a hinged tail section comprising:
    a latch/lock actuation system located in the tail section and having a mechanical interlock component;
    a ground tail support for engaging the mechanical interlock component and for providing power to the tail section from a power source independent of the aircraft to enable operation of the latch/lock actuation system, and the tail support providing an electrical interlock signal from a ground electrical bus to the latch/lock actuation system;
    a plurality of electrical control circuits located in the tail section and in an aircraft fuselage portion, wherein the electrical interlock signal provides power to the electrical control circuits;
    an over rotation power shutoff switch that provides a first electrical signal to the tail support to inhibit over rotation of the tail section by the tail support; and
    the latch/lock actuation system having a plurality of limit switches that each provide a second electrical signal to the tail support to prevent operation of the tail support to open or close the tail section if a plurality of latch pins in the tail section are not fully retracted.

2. The interlock and indication system of claim 1 wherein the electrical interlock signal is sent to an interlock relay and indicates that the tail support is engaged to the tail section to support and restrain the tail section to prevent uncontrolled opening of the tail section.

3. The interlock and indication system of claim 1 wherein the electrical interlock signal is activated after a plurality of activation conditions are met.

4. The interlock and indication system of claim 1 wherein the interlock and indication system prevents application of electrical power to the electrical control circuits of the tail section unless the tail support is engaged with the tail section, and prevents application of hydraulic power to the latch/lock actuation system of the tail section unless the tail support is engaged with the tail section.

5. The interlock and indication system of claim 1 wherein the over rotation power shutoff switch inhibits the tail support from moving the tail section over 95 degrees.

6. The interlock and indication system of claim 1 wherein one or more over rotation indication switches indicates that the tail section has rotated 95 degrees or greater.

7. The interlock and indication system of claim 1 wherein the limit switches detect the latch pins that are not retracted prior to opening the tail section and detect the latch pins that do not remain retracted while the tail section is open.

8. The interlock and indication system of claim 1 wherein the latch pins each have an unlatched limit switch and the unlatched limit switches are wired in series to control release of the tail section.

9. The interlock and indication system of claim 1 wherein the over rotation power shutoff switch actuates an over rotation power shutoff latch relay to a shutoff position when the tail section is driven by the tail support to 95 degrees.

10. The interlock and indication system of claim 9 wherein the over rotation power shutoff latch relay in the shutoff position sends a direct current electrical signal to the tail support to activate a set of brakes on the tail support and to activate a plurality of alarm components on the tail support.

11. The interlock and indication system of claim 10 wherein an over rotation power reset switch actuates the over rotation power shutoff latch relay from the shutoff position to an operating position to allow the tail support to resume powered operation.

12. An interlock and indication system for use with an aircraft having a hinged tail section, comprising:
a latch/lock actuation system located in the tail section and having a mechanical interlock component and a set of electrical control circuits, wherein the mechanical interlock component engages a ground tail support that provides power to the tail section from a power source independent of the aircraft to enable operation of the latch/lock actuation system;
an interlock signal subsystem comprising an electrical interlock signal from a ground electrical bus coupled to the tail support to operate the latch/lock actuation system, and to prevent the unlocking and unlatching of the tail section unless the tail support is engaged with the tail section;
an over rotation power shutoff subsystem comprising an over rotation power shutoff switch and an over rotation power shutoff latch relay that prevent the tail support from over rotating the tail section;
an over rotation indication subsystem comprising one or more over rotation indication switches that indicate if the tail section has over rotated; and,
a latch pin fault detection subsystem comprising a plurality of limit switches located on the tail section that detects retraction failures of a plurality of latch pins located on the tail section.

13. The interlock and indication system of claim 12 wherein the electrical interlock signal activates an interlock relay to provide electrical power to the electrical control circuits of the latch/lock actuation system.

14. The interlock and indication system of claim 12 wherein the over rotation power shutoff switch actuates the over rotation power shutoff latch relay to a shutoff position when the tail section is driven by the tail support to 95 degrees, and the over rotation power shutoff latch relay in the shutoff position sends a direct current electrical signal to the tail support to activate a set of brakes on the tail support and to activate a plurality of alarm components on the tail support.

15. The interlock and indication system of claim 14 wherein an over rotation power reset switch actuates the over rotation power shutoff latch relay from the shutoff position to an operating position to allow the tail support to resume powered operation.

16. The interlock and indication system of claim 12 wherein each of the plurality of limit switches sends an electrical signal to the tail support to prevent operation of the tail support to open or close the tail section when the plurality of latch pins are not fully retracted.

17. The interlock and indication system of claim 12 wherein the mechanical interlock component prevents application of hydraulic power to the latch/lock actuation system unless the tail support is engaged with the tail section.

18. An electrical interlock and indication system for use with an aircraft having a hinged tail section comprising:
a latch/lock actuation system located in the tail section and having a mechanical interlock component and a set of electrical control circuits, wherein the mechanical interlock component engages a ground tail support that provides power to the tail section from a power source independent of the aircraft to enable operation of the latch/lock actuation system, and further wherein the tail support has one or more attachment components for insertion into one or more respective sockets located on the tail section for attachment of the tail support to the tail section;
an interlock signal subsystem that prevents operation of the latch/lock actuation system of the tail section unless the tail support is engaged to the tail section, wherein the interlock signal subsystem comprises an electrical interlock signal from a ground electrical bus coupled to the tail support that activates an interlock relay to provide electrical power to the electrical control circuits;
an over rotation power shutoff subsystem that prevents the tail support from over rotating the tail section, wherein the over rotation power shutoff subsystem comprises an over rotation power shutoff switch that actuates an over rotation power shutoff latch relay to a shutoff position when the tail section is driven by the tail support to 95 degrees, and wherein the over rotation power shutoff latch relay in the shutoff position sends a direct current electrical signal to the tail support to activate a set of brakes on the tail support and to activate a plurality of alarm components on the tail support;
an over rotation indication subsystem that indicates if the tail section has over rotated 95 degrees or greater, wherein the over rotation indication subsystem comprises one or more over rotation indication switches that send electrical ground signals to a flight deck indication system when over rotation of 95 degrees or greater has occurred; and,
a latch pin fault detection subsystem that detects retraction failures of a plurality of latch pins located in the tail section, wherein the latch pin fault detection subsystem comprises a plurality of limit switches located on the tail section that each send an electrical signal to the tail support to prevent operation of the tail support to open or close the tail section when the plurality of latch pins are not fully retracted.

19. The interlock and indication system of claim 18 wherein the electrical interlock signal is activated after a plurality of activation conditions are met.

20. The interlock and indication system of claim 18 wherein the latch pin fault detection subsystem detects the latch pins that are not retracted prior to opening the tail section and detects the latch pins that do not remain retracted while the tail section is open.

* * * * *

UNITED STATES PATENT AND TRADEMARK OFFICE
CERTIFICATE OF CORRECTION

PATENT NO.        : 7,631,837 B2                                    Page 1 of 1
APPLICATION NO. : 11/589623
DATED             : December 15, 2009
INVENTOR(S)       : Becker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this

Second Day of November, 2010

David J. Kappos
*Director of the United States Patent and Trademark Office*